(12) United States Patent
Horn et al.

(10) Patent No.: US 7,528,344 B2
(45) Date of Patent: May 5, 2009

(54) DETERMINING THE RELATIVE POSITIONS OF THE AXES OF A LASER MACHINING BEAM AND A PROCESS GAS JET

(75) Inventors: Armin Horn, Renningen (DE); Gerhard Hammann, Korntal-Muechingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 270 days.

(21) Appl. No.: 11/682,066

(22) Filed: Mar. 5, 2007

(65) Prior Publication Data
US 2007/0228025 A1    Oct. 4, 2007

Related U.S. Application Data

(63) Continuation of application No. PCT/EP2005/008852, filed on Aug. 16, 2005.

(30) Foreign Application Priority Data

Sep. 4, 2004    (EP)    .................................. 04021074

(51) Int. Cl.
  *B23K 26/14*    (2006.01)
(52) U.S. Cl. ............................. 219/121.83; 219/121.84
(58) Field of Classification Search ...............
  219/121.63–121.72, 121.83, 121.84; 225/93.5
  See application file for complete search history.

(56) References Cited

U.S. PATENT DOCUMENTS

| 4,427,873 | A | | 1/1984 | Orita et al. |
| 4,689,467 | A | * | 8/1987 | Inoue ...................... 219/121.6 |
| 4,871,897 | A | * | 10/1989 | Nielsen .................. 219/121.67 |
| 5,191,188 | A | * | 3/1993 | Miyajima .............. 219/121.83 |
| 5,463,202 | A | | 10/1995 | Kurosawa et al. |
| 5,877,960 | A | * | 3/1999 | Gross et al. .................. 700/175 |
| 6,294,754 | B1 | * | 9/2001 | Nagura et al. .......... 219/121.63 |
| 6,407,360 | B1 | * | 6/2002 | Choo et al. ............. 219/121.67 |
| 2007/0251927 | A1 | * | 11/2007 | Miessbacher et al. .. 219/121.63 |

FOREIGN PATENT DOCUMENTS

JP    02205682 A   *   8/1990

OTHER PUBLICATIONS

Preliminary Report of Patentability from corresponding PCT Application No. PCT/EP2005/008852, mailed Jun. 21, 2007, 6 pages.

\* cited by examiner

*Primary Examiner*—Samuel M Heinrich
(74) *Attorney, Agent, or Firm*—Fish & Richardson P.C.

(57) ABSTRACT

Determination of the relative positioning of a laser machining beam and a process gas jet on a laser machine tool are accomplished by motion of detections made while moving the machining beam and gas jet in relation to a detection element. In some cases actions of the beam and gas jet themselves are detected, such as by cutting light response and sensor deflection caused by the gas jet. Relative head positions at the time of the deflections are used to calculate misalignment between the laser beam and gas jet.

25 Claims, 4 Drawing Sheets

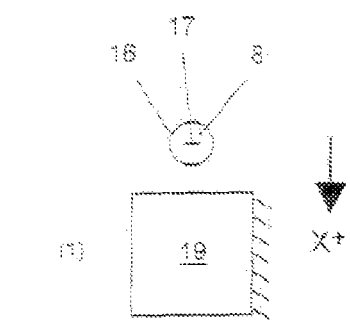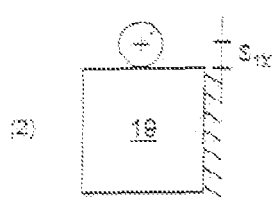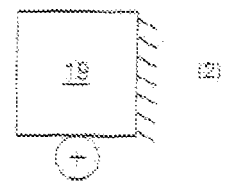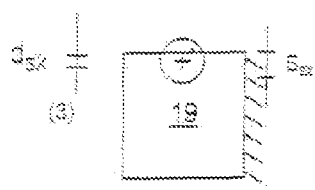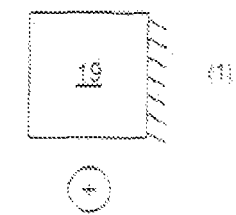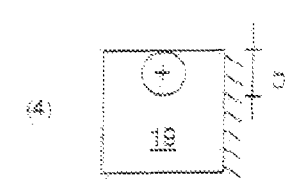
Fig. 7
Fig. 6

DETERMINING THE RELATIVE POSITIONS OF THE AXES OF A LASER MACHINING BEAM AND A PROCESS GAS JET

RELATED APPLICATIONS

This application is a continuation of PCT application PCT/EP2005/008852, filed Aug. 15, 2006, and claims priority under 35 U.S.C. § 119(a) from European patent application EP 04 021 074.2, filed Sep. 4, 2004. The entire contents of both priority applications are hereby incorporated by reference.

TECHNICAL FIELD

This invention relates to methods and devices for determining and/or adjusting the relative positions of the axes of a laser machining beam and a process gas jet, and to laser machining systems utilizing these methods and devices.

BACKGROUND

In different types of laser machining of workpieces, in addition to a laser machining beam a process gas jet is directed onto the machining point. In laser cutting, for instance, oxygen or inert gases, for example nitrogen or argon, can be considered as process gases. Molten material that is formed in the course of the cutting process is intended to be blown away from the kerf by the process or cutting gases. During infeed of oxygen as the process gas, the cutting process is additionally assisted by oxidation processes at the machining point. In these processes, an appropriate position of the laser machining beam relative to the process gas jet is required. In the case of laser cutting, optimum machining results are achieved when the laser beam axis of the laser machining beam directed onto the workpiece and the gas jet axis of the cutting gas jet directed onto the workpiece coincide with one another. For a wide variety of reasons, for example due to contamination of the laser nozzle of the laser machining head, a desired relative positioning of the laser beam axis and the gas jet axis, once set, is not sustained for an unlimited time during operation of a laser machine tool. Thus, to achieve optimum machining results, the relative positions of the laser beam axis and the gas jet axis should be monitored and corrected upon undesirable variation from the desired position.

Methods of the generic kind provided for that purpose and a laser machine tool of the generic kind implementing these methods are known from DE 43 36 136 A1. In this prior art, the machining point of a laser machining beam is detected by means of a camera through the nozzle orifice of a laser nozzle on a laser machining head. The offset, if applicable, of the machining point, and thus of the laser beam axis of the laser machining beam, with respect to the centre of the nozzle orifice on the laser nozzle defining the position of the gas jet axis of a process gas jet is determined by signal evaluation. The determined offset of the laser beam axis and gas jet axis ultimately forms the basis for a correction of the relative position of the two axes.

A further method of the generic kind for determining the position of a laser beam axis of a laser cutting beam of a laser cutting machine relative to that of a gas jet axis of a cutting gas jet, is known from industrial practice under the name "tape shot method." In this case, first of all the nozzle orifice of a laser nozzle on a laser cutting head is taped over with an adhesive tape. Then a laser cutting beam is directed briefly through the nozzle orifice. The position of the centre of the hole produced by the laser cutting beam in the adhesive tape relative to the middle of the laser nozzle is finally established as the relative position of laser beam axis and gas jet axis. On variation from the desired relative position, the position of the laser cutting beam or the cutting gas jet as the case may be is corrected to eliminate the positional variation.

SUMMARY

The methods and devices disclosed herein allow a determination and, if necessary, a corresponding adjustment of the relative positions of a laser beam axis and a gas jet axis, each adapted to the customary functions of laser machine tools.

According to one aspect, the invention features a method for determining a relative positioning of a laser beam and an associated gas jet of a laser processing tool. The method includes (a) providing a laser beam position indicator defining an axis of fixed position with respect to the laser beam; (b) providing a gas jet position indicator the position of which correlates with the position of the gas jet, the gas jet position indicator in known relative position to the laser beam position indicator; (c) causing relative motion between the position indicators and a position detection element, such that the position indicators traverse at least a leading edge of the position detection element, while detecting when each of the two position indicators engages the position detection element; and (d) determining an actual relative positioning of the light beam and gas jet as a function of motion between the detected engagements. Each of the position indicators may be either a fluid stream, e.g., a jet or stream of liquid or gas, or a beam of light, e.g., a laser beam.

According to another aspect of the invention, to determine the relative positions of the axes a laser beam position indicator, the axis of which represents the laser beam axis of the laser machining beam, a gas jet position indicator, the axis of which represents the gas jet axis of the process gas jet, and an axial position detection element are moved relative to one another in the direction transverse to the laser beam or laser beam axis. In this respect, to determine axial position, movements are performed that by their nature are also to be performed in normal operation of the laser machine tool—for instance for positioning the laser machining beam with respect to the workpiece to be machined or for workpiece machining. There is consequently an opportunity to utilize drives and drive or movement control means that are already required for normal operation of the laser machine tool for the axial position determining movements of the first axial position detection beam, the second axial position detection beam, and the axial position detection element. Thus, the determination of the relative positions of the axes can be readily integrated into the customary functions of a laser machine tool. Using the devices disclosed herein, the location where the relative position of the laser beam axis and gas jet axis is determined is shifted into a region remote from the axial position detection beams and the laser beam axis and the gas jet axis. Last but not least, therefore, the invention allows a user-friendly and at the same time high-precision determination of the relative positions of the laser beam axis and the gas jet axis.

In some implementations, a laser beam having the laser beam axis serves as the laser beam position indicator and/or a gas jet having the gas jet axis serves as the gas jet position indicator. The laser beam used as the laser beam position indicator need not necessarily be a laser machining beam as directed in normal operation of the laser machine tool onto the workpiece in question. It is possible, for example, to use a laser beam of a lower beam power, which would be insufficient for normal workpiece machining, to detect the axial position. Similarly, it is not compulsory to use a process gas jet as the gas jet for detecting the axial position. For example, for reasons of cost it may be advantageous to generate the gas jet for detecting the axial position not with a relatively expensive process gas but with a less expensive gas, for instance with atmospheric air. However, it may be advantageous to use position indicators that correspond to the greatest possible extent to the laser machining beam directed in normal machine operation onto the workpiece to be machined and to such a process gas jet, because the step of determining the relative position of the laser beam axis of the laser machining beam and the gas jet axis of the process gas jet can then be performed under conditions that at least come very close to the conditions in normal machine operation. In this case, the results produced will closely reflect the circumstances during normal machine operation.

If the machining head of the laser machine tool serves as the common reference element for the laser beam axis and the gas jet axis devices for driving and movement control of the machining head that are also used in normal operation of the laser machine tool can be used to determine the relative positions of the axes.

In some applications, such as typical laser cutting, congruence of the laser beam axis and the gas jet axis is stipulated. In such cases, the method may include causing coupled movement of the common reference element for the laser beam axis and the gas jet axis with the axial position detection movement, and checking whether the relative position of the first beam axis and the axial position detection element and of the second beam axis and the axial position detection element is associated with the position of the common reference element.

In a further embodiment, the relative position of the laser beam axis and the gas jet axis is determined by means of those portions that the reference element for the laser beam axis and the reference element for the gas jet axis assume upon impingement for the first time of the axes of the position indicators of the axial position detection element. With the very first impingement of the axes of the position indicators on the axial position detection element, a clearly defined state of the arrangement for axial position detection is provided as the trigger for the detection of the positions of the reference element for the laser beam axis and the reference element for the gas jet axis. Consequently, it is possible to ensure that positions of the reference element or elements are detected that allow a precise conclusion to be drawn about the position of the laser beam axis and the gas jet axis and their relative positions.

In some implementations, defining and detecting the very first impingement of the axes of the position indicators on the axial position detection element is achieved by making use of devices already available. For instance, the impingement may be detected by monitoring production of light or measuring distance of deflection. In normal machine operation it is customary to detect the process light production at the workpiece-side machining point of a laser machining beam for control and monitoring of the piercing process on workpieces. Distance measurements are also common, for example, in the cutting operation of a laser machine tool. There, the distance between laser nozzle and workpiece is detected and monitored to ensure an unchanging position of the laser beam focus with respect to the workpiece.

The invention also features laser machining systems. For example, in one aspect the invention features a laser machining system that includes (a) a workpiece support; (b) a laser head movable across the workpiece support to process a workpiece, the laser head configured to emit a laser beam defining a laser beam axis and an associated flow of gas defining a gas flow axis; (c) a control unit configured to adjust a relative positioning of the laser beam and gas flow axes; and (d) an alignment detection element connected to the control unit and positioned to be traversed by the laser head, the detection element being responsive to engagement of the element by the gas flow as the laser head traverses the element, and responsive to impingement of the laser beam at a leading edge of the element. The control unit is configured to determine a first position of the traversing laser head as the gas flow engages the detection element, and a second position of the traversing laser head as the laser beam impinges the leading edge of the element, and to determine a relative positioning of the laser beam and gas flow as a function of at least the first and second determined positions of the laser head.

The details of one or more embodiments of the invention are set forth in the accompanying drawings and the description below. Other features and advantages of the invention will be apparent from the description and drawings, and from the claims.

DESCRIPTION OF THE DRAWINGS

FIGS. 4 to 7 are diagrams relating to the sequence of determining the relative positions of the laser beam axis of the laser cutting beam and the gas jet axis of the cutting gas jet.

Like reference numbers indicate similar elements.

DETAILED DESCRIPTION

Figure 1:
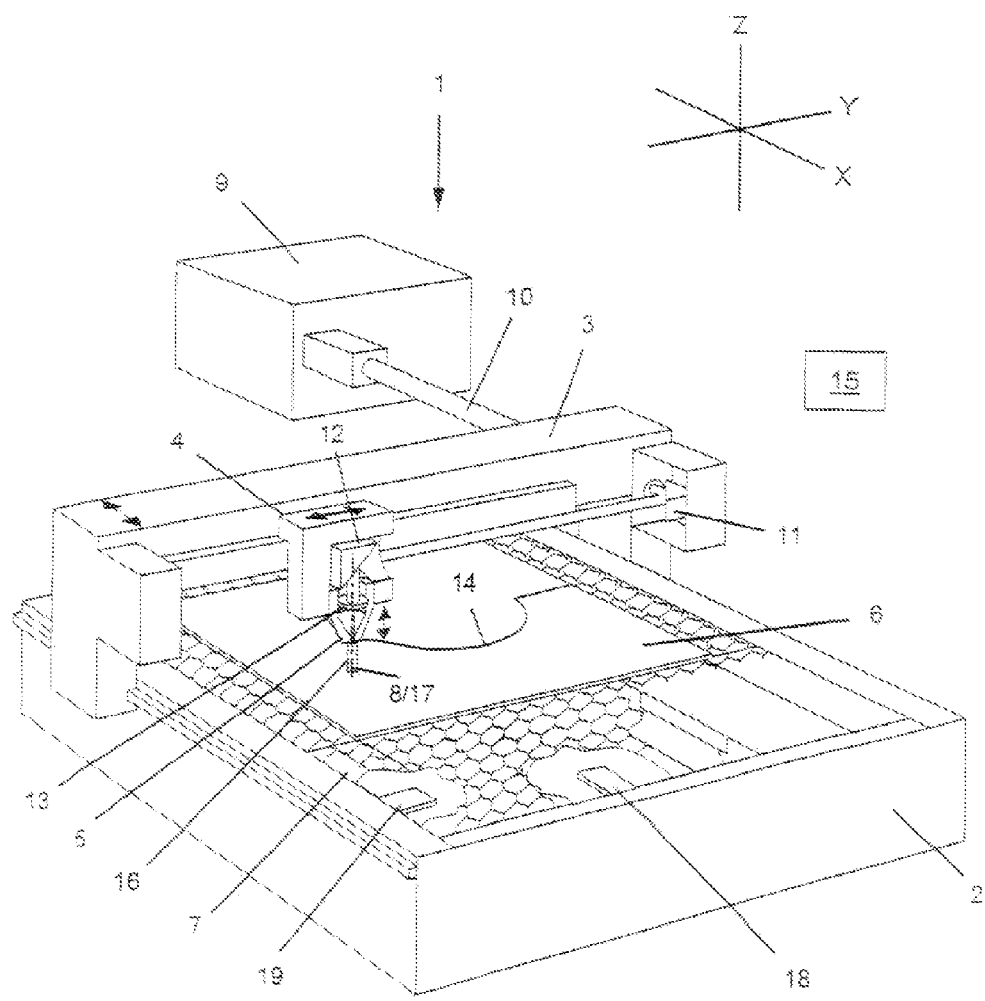
FIG. 1 shows a laser cutting machine during workpiece cutting using a laser cutting beam, and with a cutting gas jet being fed onto the machining point.
Figure 2:
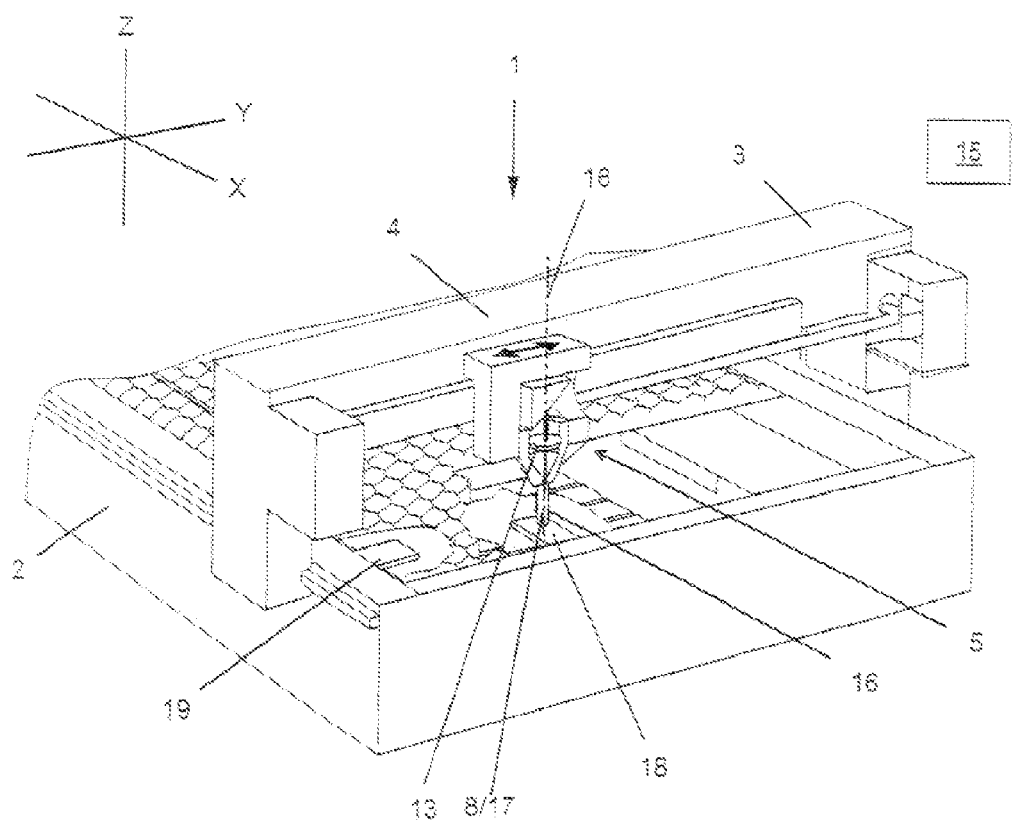
FIG. 2 shows the laser cutting machine according to FIG. 1 during determination of the relative positions of the laser beam axis of the laser cutting beam and the gas jet axis of the cutting gas jet.

According to FIG. 1, a laser machine tool in the form of a laser cutting machine 1 comprises a machine bed 2, on which a bridge 3 is movably guided in a first axial direction (X-direction). The bridge 3 for its part supports, on a cross bearer, a sliding guide 4 with a laser machining or laser cutting head 5, shown broken away. Jointly with the sliding guide 4 the laser cutting head 5 is movable in a second axial direction (Y-direction) along the cross bearer of the bridge 3. Furthermore, the laser cutting head 5 is movable relative to the sliding guide 4 in a third axial direction (Z-direction). Beneath the laser cutting head 5, a workpiece in the form of a metal sheet 6 is arranged on a workpiece support 7.

A laser beam that is represented in the diagrams with a laser beam axis 8 is used to machine the metal sheet 6. The laser beam is generated by a laser beam source 9 and is guided through a beam guide tube 10 and via deflecting mirrors 11, 12 to a focusing optical element 13 (lens or mirror) mounted inside the laser cutting head 5. The focusing optical element 13 focuses the laser beam and directs it as the laser cutting beam onto the metal sheet 6. Owing to the described mobility of the bridge 3 and of the sliding guide 4, any desired point on the metal sheet 6 can be machined with the laser cutting beam. A cut 14 made in the metal sheet 6 in the example shown is indicated in FIG. 1. The mobility of the laser cutting head 5 in the Z-direction is used to adjust the focal position of the laser cutting beam in the direction transverse to the metal sheet.

A motor drive of the laser cutting machine 1, which is controlled by means of a numerical control unit 15, is used to move the laser cutting head 5 in the three directions in space. The remaining functions of the laser cutting machine 1 are also integrated into the numerical control unit 15 in terms of control.

Jointly with the laser cutting beam, a process gas jet in the form of a cutting grass jet 16 is directed from the laser cutting head 5 onto the metal sheet 6. The cutting gas fed onto the metal sheet 6, for example nitrogen gas, is used to blow the molten metal formed at the machining point of the laser cutting beam on the metal sheet away from the resulting kerf. Ideally, the laser beam axis 8 of the laser cutting beam and a gas jet axis 17 of the cutting gas jet 16 coincide. The laser cutting machine 1 is illustrated in FIG. 1 with this optimum mutual positioning of the laser beam axis 8 and the gas jet axis 17.

In routine operation of the laser cutting machine 1, the laser cutting beam axis 8 and the cutting gas jet axis 17 may move out of alignment, such that the axes do not coincide. To determine any variation of the actual relative positions of the laser beam axis 8 and gas jet axis 17 from the desired relative positioning, use is made of axial position detection elements 18, 19, which are mounted at a longitudinal end of the machine bed 2 and thus at the outermost edge of the working range of the laser cutting head 5. Each of the two axial position detection elements 18 and 19 is a spring steel platelet. The axial position detection element 18 is clamped by one of its edges running in the Y-direction and the axial position detection element 19 is clamped by one of its edges running in the X-direction to the machine bed 2. Otherwise, the axial position detection elements 18, 19 project freely from the machine bed 2. The edges immediately adjoining the clamped edge of the axial position detection element 18 run in the X-direction, while the edges immediately adjoining the clamped edge of the axial position detection element 19 run in the Y-direction. The position of both axial position detection elements 18, 19 is defined in the X-Y-Z coordinate system of the laser cutting machine 1.

Figure 3:
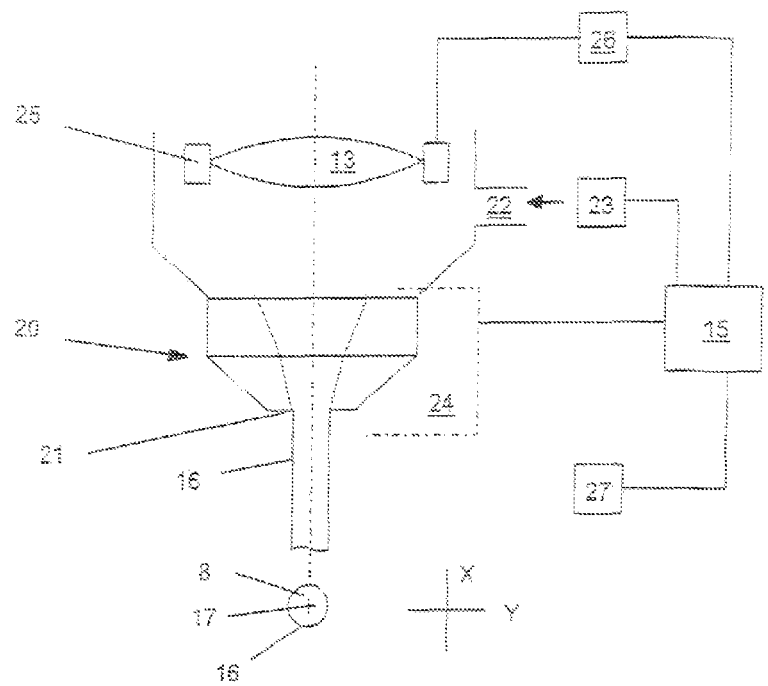
FIG. 3 shows the laser cutting head of the laser cutting machine according to FIGS. 1 and 2 in longitudinal section.

The laser cutting head 5 in FIG. 3 is illustrated with a relative misalignment of laser beam axis 8 and gas jet axis 17. This diagram also shows a laser nozzle 20 of the laser cutting head 5, through which the laser cutting beam having the laser beam axis 8 and the cutting gas jet 16 (with an outline shown in solid lines) having the gas jet axis 17 are directed on the metal sheet 6. For that purpose, the laser nozzle 20 is provided with a nozzle orifice 21 (for example, circular or with an annular slot). The gas jet axis 17 runs through the midpoint of the nozzle orifice 21. The cutting gas is supplied to the laser cutting head 5 by a cutting gas supply 23 via a gas inlet 22. The cutting gas supply 23 is controllable by the numerical control unit 15.

The laser nozzle 20 is part of a conventional, capacitive distance-measuring device 24. Measuring devices of this kind are marketed, for example, by TRUMPF, of Ditzingen, Germany, under the name "DIAS." The distance between the underside of the laser nozzle 20 and the surface of a metal workpiece facing the laser nozzle 20 is determinable by the distance-measuring device 24. The distance-measuring device 24 is also connected to the numerical control unit 15 of the laser cutting machine 1.

Also shown in FIG. 3 is a mount 25 for the focusing optical element 13. The mount 25 is mounted on the housing of the laser cutting head 5 so as to be adjustable in the X and Y-directions. Any adjustment movements are performed by an actuator 26, which in turn is controlled by the numerical control unit 15 of laser cutting machine 1.

Finally, the laser cutting machine 1 is provided with an optical process light measuring device 27. The process light measuring device 27 is also of conventional construction. Such measuring devices are marketed, for example, by TRUMPF, of Ditzingen, Germany, under the name "PCS." Process light that occurs at the sheet metal-side machining point of the laser cutting beam is measured by the process light measuring device 27. The process light measuring device 27 is also connected to the numerical control unit 15 of the laser cutting machine 1.

The procedure during monitoring of the positions of the laser beam axis 8 and the gas jet axis 17 for the existence of a variation from the desired mutual positioning is explained with reference to FIGS. 4 to 7. The nozzle orifice 21 has a circular cross-section in the implementation shown.

Figure 4:
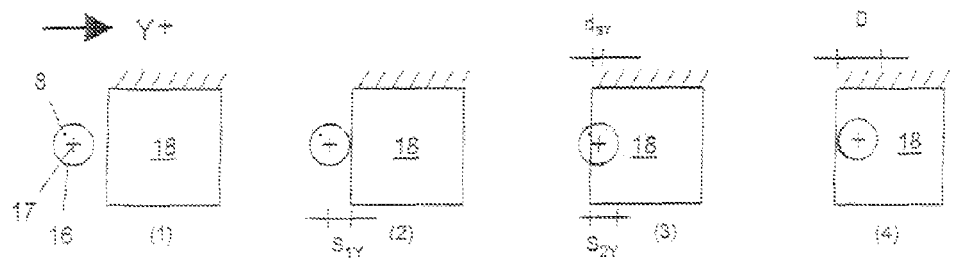

As shown in FIG. 4, the laser cutting head 5, as common reference element for the laser beam axis 8 and the gas jet axis 17, is moved with the laser nozzle 20 in the positive direction of the Y-axis (Y$^+$-direction) with an axial position detection movement over the axial position detection element 18. As soon as the laser nozzle 20 comes to lie above the metal axial position detection element 18, the distance-measuring device 24 starts to determine the distance between the laser nozzle 20 and the axial position detection element 18. The cutting gas supply 23 is switched on; a cutting gas jet 16 is consequently directed downwards from the laser cutting head 5 and is, at the beginning, still spaced from the axial position detection element 18 (subfigure (1) of FIG. 4).

In the course of the movement of the laser cutting head 5 in the Y$^+$-direction, the cutting gas jet 16 reaches the axial position detection element 18 (subfigure (2) of FIG. 4). In this example, the leading edge of element 18 defines an axis reference plane. On very first impingement of the cutting gas on the axial position detection element 18, downward deflection of the detection element commences. The start of the deflection of the axial position detection element 18 is established by means of the distance-measuring device 24 and marks a time at which the position of the laser cutting head 5 in the Y$^+$-direction is detected. Assuming that the cross-section of the cutting gas jet 16 corresponds ideally to the circular cross-section of the nozzle orifice 21 of the laser nozzle 20, and assuming that the radius of the nozzle orifice 21 is known, the position of the laser cutting head 5 in the Y$^+$-direction at which the gas jet axis 17 reaches the front edge or reference plane of the axial position detection element 18 easily follows. In subfigure (2) of FIG. 4 the distance that the laser cutting head 5 has to cover between the very first impingement of the cutting gas jet 16 on the axial position detection element 18 and the gas jet axis 17 reaching the front edge of the axial position detection element 18 is denoted by "$S_{1Y}$".

On continued movement of the laser cutting head 5 in the Y$^+$-direction, the overlap between the nozzle orifice 21 and the axial position detection element 18 increases. This is associated with an increase in the deflection of the axial position detection element 18.

In addition, during the course of movement of the laser cutting head 5 in the Y$^+$-direction, the laser beam axis 8 also reaches the front edge and associated reference plane of the axial position detection element 19 (subfigure (3) of FIG. 4). Associated with this is a first cut of the axial position detection element 18 by the laser cutting beam. The light flash occurring as the laser cutting beam cuts into the axial position detection element 18 is detected by the process light measuring device 27, and marks a second time at which the position of the laser cutting head 5 in the Y$^+$-directions is determined. This position of the laser cutting head 5 in the Y$^+$-direction is compared with the position of the laser cutting head 5 on first impingement of the cutting gas jet 16 on the axial position detection element 18. In the example shown, the laser cutting head 5 has covered a distance "$S_{2Y}$" between the two noted positions. The distance $S_{2Y}$ is greater by $d_{SY}$ than the distance $S_{1Y}$. The parameter $d_{SY}$ thus describes the relative offset of the laser beam axis 8 and the gas jet axis 17 in the Y-direction. The parameter $d_{SY}$ is determined by a dedicated evaluating device of the numerical control unit 15 of laser cutting machine 1.

The laser cutting beam is switched off immediately after piercing the axial position detection element 18. Switching off the laser cutting beam is effected by the numerical control unit 15 of the laser cutting machine 1, which controls the laser beam source 9 correspondingly.

If, contrary to the previous assumption, the radius or diameter of the cutting gas jet 16 is assumed to be unknown, then the method described above must be modified. As a supplementary measure the diameter of the cutting gas jet 16 is then determined.

In that case, the positions of the laser cutting head 5 on very first impingement of the cutting gas jet 16 on the axial position detection element 18 (subfigure (2) of FIG. 4) and as the laser cutting beam pierces the axial position detection element 18 (subfigure (3) of FIG. 4) are likewise determined. The laser cutting beam is also in this case switched off immediately after the laser cutting beam pierces the axial position detection element 18. In addition to the two positions of the laser cutting head 5 mentioned above, that position of the laser cutting head 5 in the Y$^+$-direction in which the deflection of the axial position detection element 18 reaches its maximum value under the action of the cutting gas jet 16 is then also determined. This maximum value occurs as soon as the cutting gas jet 16 in the course of its movement in the Y$^+$-direction comes to lie with its full cross-section above the axial position detection element 18, i.e. as soon as the trailing edge of the cutting gas jet 16 reaches the edge of the axial position detection element 18 (subfigure (4) of FIG. 4). The distance that the laser cutting head 5 has covered between the very first impingement of the cutting gas jet 16 on the axial position detection element 18 and the maximum deflection of the axial position detection element 18 describes the diameter, i.e., the dimension "D" of the cutting gas jet 16 in the Y-direction.

If the laser beam axis 8 and gas jet axis 17 were congruent, then, after moving a distance ½D from the very first impingement of the cutting gas jet 16 on the axial position detection element 18, the laser cutting beam would accordingly have had to cut into the axial position detection element 18. Because the axes were misaligned in the example shown, this was not the case. On the contrary, the laser cutting head 5 covered a distance ½D +$d_{SY}$ between very first impingement of the cutting gas jet 16 on the axial position direction element 18 and piercing of the axial position detection element 18 by the laser cutting beam. As in the method described above, $d_{SY}$ is thus the offset of the laser beam axis 8 and the gas jet axis 17 in the Y-direction.

Improved accuracy is generally obtained by using the actual dimension of the cutting gas jet 16 in the Y-direction, rather than the diameter of the nozzle orifice 21 of the laser nozzle 20, as the basis for determining any offset of the laser beam axis 8 and the gas jet axis 17. The actual dimension of the cutting gas jet 16 may vary from the diameter of the nozzle orifice 21, for example, because of the contamination of the nozzle orifice 21. If the diameter of the uncontaminated nozzle orifice is known, the described measurement of the diameter of the cutting gas jet 16 can serve also for verifying the degree of contamination of the laser nozzle 20.

In cases in which the degree of deflection of the axial position detection element 18 caused by the cutting gas jet 16 is not detectable with sufficient accuracy, in order to determine the dimension of the cutting gas jet 16 in the Y-direction the axial position detection element 18 is "contacted" with the cutting gas jet 16 not only, as described above, in the Y$^+$-direction but also in the Y$^-$-direction.

Figure 5:
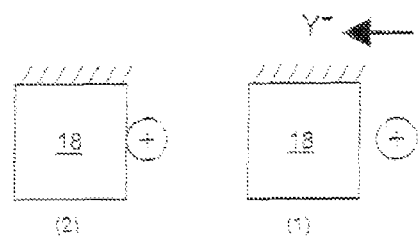

As is apparent from FIG. 5, in this case the laser cutting head 5 is moved, with the cutting gas jet 16 to begin with still remote from the axial position detection element 18 (subfigure (1) of FIG. 5), and with the laser cutting beam switched off, in the Y$^-$-direction, until the cutting gas jet 16 impinges of the axial position detection element 18 for the very first time (subfigure (2) of FIG. 5). Commencement associated therewith of the deflection as such of the axial position detection element 18 is at any rate clearly determinable by the distance measuring device 24. The first impingement of the cutting gas jet 16 moved in the Y$^+$-direction and the associated commencement of the deflection of the axial position detection element 18 had also been correspondingly clearly identified in the previous case (subfigure (2) of FIG. 4).

The position of the laser cutting head 5 in the Y-direction is detected both at the time at which deflection of the axial position detection element 18 by the cutting gas jet 16 moved in the Y$^+$-direction commences and at the time at which deflection of the axial position detection element 18 by the cutting gas jet 16 moved in the Y$^-$-direction commences. Between the two cutting head positions is a distance that corresponds to twice the dimension of the cutting gas jet 16 in the Y-direction plus the width of the axial position detection element 18 in the Y-direction. The width of the axial position detection element 18 as well as the distance between the two said cutting head positions are known; the dimension of the cutting gas jet 16 in the Y-direction and the diameter D of the cutting gas jet can consequently be calculated.

In addition to the offset of the laser beam axis 8 and the gas jet axis 17 in the Y-directions, in the example shown the offset $d_{SX}$ in the X-direction is also determined. For that purpose, the laser cutting head 5 is guided with the laser cutting beam and the cutting gas jet 16 in the direction of the X-axis over the axial position detection element 19. In detail, the procedure is the same as for determining the offset $d_{SY}$ of the laser beam axis 8 and the gas jet axis 17. FIGS. 6 and 7 illustrate the determination of the offset $d_{SX}$ of the laser beam axis 8 and the gas jet axis 17, including determination of the dimension D of the cutting gas jet 16 in the direction of the X-axis.

Using the offset of the laser beam axis 8 and the gas jet axis 17 existing in the Y-direction and in the X-direction, a correction value is generated by a dedicated computer unit of the numerical control unit 15. On the basis of this correction value, the numerical control unit 15 of the laser cutting machine 1 controls the actuator 26 of the mount 25 for the focusing optical element 13. Jointly with the focusing optical element 13, the mount 25 is adjusted in the plane defined by the X-axis and the Y-axis into a position in which the focusing optical element 13 directs the laser cutting beam coaxially with the cutting gas jet 16 onto the metal sheet 6.

Although in the illustrated example the laser beam itself is employed as the axial position detection beam, it will be understood that a separate beam having a beam axis arranged in defined manner with the laser beam axis can be sensed in order to determine the position of the laser beam axis. Similarly, a light beam or a gas jet having an axis in defined relation to the gas jet can be sensed to determine the actual position of the gas jet.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining a relative positioning of a laser beam and an associated gas jet of a laser processing tool, the method comprising:
    providing a laser beam position indicator the position of which correlates with the position of the laser beam;
    providing a gas jet position indicator the position of which correlates with the position of the gas jet;
    causing relative motion between the position indicators and a position detection element, such that the position indicators traverse at least a leading edge of the position detection element, while detecting when each of the two position indicators engages the position detection element; and
    determining an actual relative positioning of the light beam and gas jet as a function of motion between the detected engagements,
    causing relative motion between the position indicators and a position detection element such that the position indicators are each moved into a same position on an axis associated with the relative motion, with respect to the position detection element;
    detecting positions, as positions in a coordinate system of the laser processing tool, of the position indicators as moved into said same position;
    comparing the detected positions of the position indicators with each other; and
    determining an actual relative positioning of the laser beam and the gas jet as a function of a difference between the detected positions of the position indicators.

2. The method of claim 1 wherein the laser beam position indicator comprises the laser beam of the laser processing tool.

3. The method of claim 1 wherein the gas jet position indicator comprises the gas jet of the laser processing tool.

4. The method of claim 1 wherein the position detection element is fixedly mounted and the position indicators are moved relative to the position detection element.

5. The method of claim 4 wherein the position detection element comprises a member mounted on a machine bed of the laser cutting machine and includes sensors configured to detect impingement of light on the member and/or gas pressure exerted on the member.

6. The method of claim 4 wherein the relative positioning of the position indicators remains constant during movement of the position indicators.

7. The method of claim 1 further comprising at least one reference element of known position with respect to positions of the laser beam and the gas jet.

8. The method of claim 7 wherein the reference element comprises a laser cutting head of the laser processing tool, through which the laser beam and the gas jet pass during operation.

9. The method of claim 1 further comprising comparing the actual relative positioning of the laser beam and gas jet to a predetermined desired relative positioning.

10. The method of claim 9 further comprising adjusting the machine to move one of the laser beam and gas jet with respect to the other of the laser beam and gas jet, in accordance with a determined difference between the actual relative positioning and the desired relative positioning.

11. A method for determining the relative position of a laser beam axis of a laser machining beam on the one hand and a gas jet axis of a process gas on the other hand on a laser machine tool for machining workpieces, wherein on the one hand a laser beam position indicator having a first axis arranged in defined manner with respect to the laser beam axis and a gas jet position indicator having a second axis arranged in defined manner with respect to the gas jet axis, and on the other hand an axial position detection element, are movable relative to one another with an axial position detection movement in a direction transverse to the axes, the method comprising
    causing coupled movement of a laser beam reference element located in a defined spatial association with respect to the first axis and a gas jet reference element located in a defined spatial association with respect to the second axis and/or a position detection reference element located in a defined spatial association with respect the axial position detection element, with the axial position detection movement; and
    comparing actual positions of the laser beam reference element and of the gas jet reference element and/or of the position detection reference element, which are associated with one and the same relative position of the first axis and the axial position detection element and of the second axis and the axial position detection element, with desired positions of the laser beam reference element and of the gas jet reference element and/or of the position detection reference element with the laser beam axis and the gas jet axis in a desired relative position.

12. The method of claim 11, wherein the laser beam position indicator comprises the laser beam.

13. The method of claim 12, further comprising subjecting the axial position detection element to a cutting action of the laser beam.

14. The method of claim 11, wherein the axial position detection element is deflectable and wherein the gas jet position indicator comprises a flow of gas, the method including
    subjecting the axial position detection element to a deflecting action of the gas jet position indicator;
    moving the gas jet position indicator with the axial position detection movement over the axial position detection element; and
    detecting the impingement of the gas jet position indicator on the axial position detection element by detecting deflection of the axial position detection element.

15. The method of claim 11, further comprising causing coupled movement of a common reference element for the laser beam axis and the gas jet axis with the axial position detection movement, and comparing (a) the actual relative positions of the common reference element, which is associated with the relative positions of the position indicators, and the axial position detection element, with (b) desired positions of the common reference element with the laser beam axis and the gas jet axis in a desired relative position.

16. The method of claim 11 further comprising comparing actual positions of the laser beam reference element and the gas jet reference element and/or of the position detection reference element, which are associated with the very first impingement of the laser beam position indicator on the axial position detection element and of the gas jet position indicator on the axial position detection element, with the desired positions of the laser beam reference element, the gas jet reference element and/or the position detection reference element with the laser beam axis and the gas jet axis in a desired relative position.

17. The method of claim 11 further comprising
    generating an adjustment value corresponding to the positional variation of the positions of the laser beam axis and the gas jet axis from the desired relative position, as determined by the comparing step; and adjusting the relative positions of the laser beam axis and the gas jet axis by adjusting the position of the laser beam axis and/or by adjusting the position of the gas jet axis on the basis of said adjustment value.

18. A laser machining system comprising a workpiece support;

a laser head movable across the workpiece support to process a workpiece, the laser head configured to emit a laser beam defining a laser beam axis and an associated flow of gas defining a gas flow axis;

a control unit configured to adjust a relative positioning of the laser beam and gas flow axes; and an alignment detection element connected to the control unit and positioned to be traversed by the laser head, the detection element being responsive to engagement of the element by the gas flow as the laser head traverses the element, and responsive to impingement of the laser beam at a leading edge of the element;

wherein the control unit is configured to determine a first position of the traversing laser head as the gas flow engages the detection element, and a second position of the traversing laser head as the laser beam impinges the leading edge of the element, and to determine a relative positioning of the laser beam and gas flow as a function of at least the first and second determined positions of the laser head.

19. A laser machine tool comprising a laser machining head from which a laser machining beam defining a laser beam axis and a process gas jet having a gas jet axis are directable onto a workpiece to be processed, the laser beam axis and gas jet axis each having an associated reference element; and a relative axis position determination device determining relative position of the laser beam axis and the gas jet axis;

wherein the position determination device comprises
a controller; and
an axial position detection element connected to the controller;

wherein a first axial position indicator defining a first indicator axis arranged in defined manner with respect to the laser beam axis and a second axial position indicator defining a second indicator axis arranged in defined manner with respect to the gas jet axis are both movable relative to the position detection element with an axial position detection movement in a direction transverse to the beam axis, wherein the reference element of the laser beam axis is in a defined spatial association with respect to the first indicator axis, the reference element of the gas jet axis is in a defined spatial association with respect to the second indicator axis;, wherein the reference element of the laser beam axis and the reference element of the gas jet axis are arranged to undergo coupled movement with respect to the position detection element; and wherein the controller is configured to determine a relative position of the laser beam axis and the gas jet axis based on signals received from the position detection element during said coupled movement.

20. The laser machine tool of claim 19, wherein the first axial position indicator comprises the laser beam.

21. The laser machine tool of claim 20, wherein the controller is configured to detect a first impingement of the laser beam on the axial position detection element.

22. The laser machine tool of claim 19, further comprising a common reference element for the laser beam axis and the gas jet axis, wherein the controller is configured to compare the determined relative position of the laser beam axis and the gas jet axis with a desired relative position of the laser beam axis and the gas jet axis.

23. The laser machine tool of claim 19, wherein the reference element of the laser beam axis and the reference element of the gas jet axis both comprises the laser machining head.

24. The laser machine tool of claim 19 wherein the second axial position indicator comprises a flow of gas.

25. The laser machine tool of claim 19, wherein the position determination device forms part of an adjustment device configured to adjust the relative position of the laser beam axis and the gas jet axis.

* * * * *

UNITED STATES PATENT AND TRADEMARK OFFICE
CERTIFICATE OF CORRECTION

| | | |
|---|---|---|
| PATENT NO. | : 7,528,344 B2 | Page 1 of 1 |
| APPLICATION NO. | : 11/682066 | |
| DATED | : May 5, 2009 | |
| INVENTOR(S) | : Armin Horn and Gerhard Hammann | |

It is certified that error appears in the above-identified patent and that said Letters Patent is hereby corrected as shown below:

On the title page, item 75 delete "Korntal-Muechingen" and insert --Korntal Muenchingen--.

In column 1, line 8, delete "filed Aug. 15, 2006," and insert --filed Aug. 15, 2005--.

In column 9, claim 5, line 43, delete "cuffing" and insert --cutting--.

In column 9, claim 8, line 53, delete "cuffing" and insert --cutting--.

In column 12, claim 19, line 11, delete "axis;," and insert --axis;--.

Signed and Sealed this

Second Day of March, 2010

David J. Kappos
*Director of the United States Patent and Trademark Office*